United States Patent Office 3,366,645
Patented Jan. 30, 1968

3,366,645
PROCESS FOR THE PRODUCTION OF 3,4-EPOXY-TETRAMETHYLENE SULFONE
Walter Dittmann and Heinz Stork, Marl, Germany, assignors to Chemische Werke Huls A.G., Marl, Germany
No Drawing. Filed Mar. 18, 1965, Ser. No. 440,953
Claims priority, application Germany, Mar. 25, 1964, C 32,502
14 Claims. (Cl. 260—332.1)

ABSTRACT OF THE DISCLOSURE

Production of 3,4-epoxy-tetramethylene sulfone, a polyvinyl chloride stabilizer, by reacting butadiene sulfone with peracetic acid at 30–80° C., especially 50–70° C. in the presence of a solvent.

This invention relates to a process for producing 3,4-epoxy-tetramethylene sulfone.

To produce 3,4-epoxy-tetramethylene sulfone, it has been proposed to epoxidize butadiene sulfone by means of performic acid at room temperature. With this process, 3,4-epoxy-tetramethylene sulfone is obtained, and the product is very stable and can even be recovered unchanged after three hours of boiling in 98% formic acid. On the other hand, because of a low yield of only 30% of theory, the use of large quantities of formic acid, and the relatively complicated working-up process, this process is costly and is relatively inconvenient for large-scale production.

It is also known that, by substituting peracetic acid for performic acid in the above reaction under comparative conditions, there are obtained instead of desired 3,4-epoxy-tetramethylene sulfone, deleterious quantities of the corresponding 3,4-dihydroxy-tetramethylene sulfone and/or its mono- or diacetate. In view of the latter result, and in further view of the general homology rule which makes an exception of the first member, it was to be concluded that epoxidation without dihydroxy formation could take place only with performic acid.

An object of this invention, therefore, is to provide an improved process for the production of 3,4-epoxy-tetramethylene sulfone.

Upon further study of the specification and claims, other objects and advantages of the present invention will become apparent.

To attain these objects, it has been discovered, contrary to all expectations, that 3,4-epoxy-tetramethylene sulfone can be produced, with high yields and without deleterious quantities of side products, by the epoxidation of butadiene sulfone with peracids other than performic acid, in particular peracetic acid, by reacting the butadiene sulfone with the peracid at a particular temperature range of 30–80° C. in a solvent, such as water or an organic solvent. The essential importance of the latter temperature range is shown in the summary table following Example 16.

To conduct the process, peracetic acid, for example, is added to the butadiene sulfone under stirring, the butadiene sulfone, preferably, having been entirely or partially dissolved in water or organic solvents, and preferably having been first heated to the required temperature.

The butadiene sulfone starting material conforms to the formula

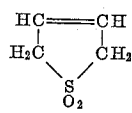

The latter can be produced by conventional methods, i.e., by reacting butadiene with sulfur dioxide, for example in accordance with U.S. Patent No. 2,395,050.

The epoxidation of the butadiene sulfone is advantageously conducted at temperatures of 50–70° C. for higher yields. Depending upon the reaction temperature and the concentration of the peracetic acid, which concentration by weight preferably varies between 20 and 70%, the reaction time necessary for accomplishing a complete reaction of the butadiene sulfone is 5 to 100 hours. At temperatures above 50° C., the reaction is terminated in about 5 to 25 hours.

In addition to water, numerous organic solvents can be considered for utilization as solvents for the peracetic acid and the butadiene sulfone, for example alcohols, such as methanol, ethanol, isopropanol, tert. butanol; ethers, such as dioxane; ketones, such as acetone; esters, such as methylacetate, ethylacetate; carboxylic acids, such as acetic acid, propionic acid; aliphatic and aromatic hydrocarbons, such as cyclohexane, benzene, toluene, ethyl benzene, xylene, and chlorinated hydrocarbon, such as methylene chloride, chloroform. It is advantageous for the weight ratio of the solvent to the butadiene sulfone to be at least 0.5:1, preferably in the range of 0.5:1 to 5:1.

The process of this invention can be conducted especially simply and economically in aqueous solution, the reaction "in situ" with acetic acid and hydrogen peroxide offering the special advantage that less than the stoichiometrically required quantity of acetic acid can be used. However, the already formed peracetic acid can also be supplied partially or completely together with the butadiene sulfone—if desired, dissolved in organic solvents or in water.

For the "in situ" process, the butadiene sulfone is suitably dissolved in acetic acid; and the hydrogen peroxide, of any desired concentration but preferably in the form of 30% to 60% aqueous solutions, is added under stirring at the desired temperature. For more complete conversion, the mole proportion of the peracetic acid or the hydrogen peroxide, respectively, to the butadiene sulfone should be at least 1:1, preferably in the range of 1:1 up to 2:1.

The recovery of the residual acetic acid resulting from the reaction of peracetic acid, and/or required for producing the peracetic acid in situ, is important for making the process economical. It can be done, for example, by distillation of the mother liquors, if desired after excess amounts of peracetic acid or hydrogen peroxide have been destroyed. Particularly suitable has proven to be a direct azeotropic distillation of the mother liquor under less than atmospheric pressure, for example, 10 to 100 mm. Hg absolute. The azeotrope former can be an aromatic, such as xylene or ethyl benzene, such a distillation making possible, in addition to a recovery of the acetic acid, the recovery of unreacted hydrogen peroxide or peracetic acid.

The separation of the reaction product is accomplished, in the simplest manner, by filtration of the resultant 3,4-epoxy-tetramethylene sulfone. In the process of this invention, the 3,4-epoxy-tetramethylene sulfone is obtained in yields of up to above 70% of theory, in the form of easily filterable white crystals. These crystals are relatively pure merely after drying and contain close to the stoichiometric quantity of epoxide oxygen. Thus, for many purposes, the 3,4-epoxy-tetramethylene sulfone produced according to the invention can be utilized without further purification. Obviously, though, the product can be further purified by recrystallization from water or organic solvents, such as ethanol, acetone, ethyl acetate, dioxane, and/or toluene.

For purposes of filtration, it is preferred to cool the reaction mixture beforehand. In case of an aqueous solution, the mixture can be cooled to a temperature of about 0–5° C. For increasing the yield, the filtrate is, if desired, concentrated in vacuum which, however, is not necessary, particularly when operating in aqueous solution.

The 3,4-epoxy-tetramethylene sulfone produced in accordance with this invention has the following formula:

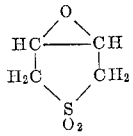

The above compound is useful for stabilizing halogen-containing polymers, for example polyvinyl chloride, copolymers of polyvinyl chloride, and polymers which have been made fire-resistant by the introduction of halogen-containing additives. A stabilizing quantity of for example 1–2% by weight of the polymer is beneficial.

The product of the invention can also be used as a reactive addition to epoxide resins and other resins. Finally, it serves as monomeric starting material for the production of polymers, such as, for example, poly-ethers and poly-esters.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

59 parts by weight of butadiene sulfone are heated, together with 30 parts by weight of water, to 60° C. At the latter temperature and with stirring of the sulfone solution, there are added dropwise within 4 hours 132 parts by volume of an aqueous peracetic acid solution containing 76 parts by weight of peracetic acid. After a reaction time of 20 hours, 11 parts by weight of unreacted peracetic acid remain in solution. Upon cooling the solution to about 0–5° C., the 3,4-epoxy-tetramethylene sulfone is crystallized. The latter is filtered and dried, the yield amounting to 47 parts by weight (70 mole percent). Melting point: 159–160° C.

$C_4H_6O_3S^{(134.1)}$—Calculated: C, 35.83; H, 4.51; O, 35.80; S, 23.86; Epoxide-O, 11.93. Found: C, 35.72; H, 4.59; O, 35.63; S, 23.20; Epoxide-O, 12.00.

Example 2

129 parts by volume of an aqueous peracetic acid solution containing 76 parts by weight of peracetic acid are added dropwise with stirring to 59 parts by weight of butadiene sulfone within 3 hours at 60° C. After 19 hours of reacting, 60 parts by weight of peracetic acid are consumed; and the working-up operation conducted in accordance with Example 1 yields 47 parts by weight (70 mole percent) of 3,4-epoxy-tetramethylene sulfone, M.P. 159–162° C. The epoxide oxygen content, determined with hydrobromic acid in glacial acetic acid, amounts to 12.1%.

The mother liquor containing unreacted peracetic acid is mixed with 250 parts by volume of ethyl benzene and distilled under decreased pressure at a sump temperature of 40–45° C. In addition to acetic acid, the aqueous phase separated from the distillate contains approximately 15 parts by weight of peracetic acid.

Example 3

As in Example 1, 59 parts by weight of butadiene sulfone are reacted with 211 parts by volume of aqueous peracetic acid solution containing 76 parts by weight of peracetic acid. After 19 hours, the solution contains about 17 parts by weight of unreacted peracetic acid. By cooling to 15° C., filtering, and drying, 41 parts by weight (61 mole percent) of 3,4-epoxy-tetramethylene sulfone are obtained, M.P. 153–155° C., epoxide oxygen 12.4%. After recrystallization from ethyl acetate, the melting point is 159–160° C., and the content of epoxide oxygen is 11.9%.

Example 4

59 parts by weight of butadiene sulfone are dissolved in 200 parts by volume of acetic acid. At 60° C., 200 parts by weight of 30% aqueous hydrogen peroxide solution are added dropwise within 1 hour. After 23 hours, the solution contains 7 parts by weight of unreacted hydrogen peroxide. The precipitate produced upon cooling to 10° C. is filtered off and dried, thereby resulting in 38 parts by weight (57 mole percent) of 3,4-epoxy-tetramethylene sulfone, M.P. 157–160° C., epoxide oxygen content: 11.9%.

Example 5

59 parts by weight of butadiene sulfone, dissolved in 50 parts by volume of ethyl acetate, are heated to 60° C. Within 5 hours, 302 parts by volume of a solution containing ethyl acetate, acetic acid, cyclohexane, and 76 parts by weight of peracetic acid are added dropwise at the above-mentioned temperature. After a reaction time of 24 hours, 58 parts by weight of peracetic acid are consumed. The precipitate obtained upon cooling to 5° C. is filtered off and dried. Thus, there are obtained 42 parts by weight (63 mole percent) of 3,4-epoxy-tetramethylene sulfone, M.P. 155–158° C., content of epoxide oxygen, 12.3%.

Example 6

During a period of 4 hours, 181 parts by volume of an aqueous peracetic acid solution containing 76 parts by weight of peracetic acid are added dropwise at 50° C., with stirring, to 59 parts by weight of butadiene sulfone. After a reaction time of 25 hours, 56 parts by weight of peracetic acid are consumed. By working up in accordance with Example 1, 42 parts by weight (63 mole percent) of 3,4-epoxy-tetramethylene sulfone are obtained, M.P. 156–158° C., epoxide oxygen content: 11.7%.

Example 7

The process of Example 6 is conducted at a reaction temperature of 40° C. and for a reaction period of 88 hours. The unreacted peracetic acid amounts to 6 parts by weight; and the yield is 44 parts by weight (66 mole percent) of 3,4-epoxy-tetramethylene sulfone, M.P. 157–159° C., epoxide oxygen content: 11.7%.

Example 8

Within 5 hours, 267 parts by volume of a solution containing ethyl acetate, acetic acid, cyclohexane, and 76 parts by weight of peracetic acid are added dropwise to 59 parts by weight of butadiene sulfone dissolved in 50 parts by volume of ethyl acetate, this being done at 80° C. After a reaction time of 7 hours, the solution, still containing about 30 parts by weight of unreacted peracetic acid, is cooled to 5° C. The thus-crystallized substance is filtered and dried, thereby obtaining 35 parts by weight (45 mole percent) of 3,4-epoxy-tetramethylene sulfone, M.P. 154–156° C., epoxide oxygen content: 12.4%.

Example 9

59 parts by weight of butadiene sulfone are heated with stirring to 70° C. with 176 parts by volume of an aqueous peracetic acid solution containing 76 parts by weight of peracetic acid. After a recation time of 15 hours at 70° C., 50 parts by weight of peracetic acid are consumed. The precipitate obtained after cooling to 0–5° C. is filtered and dried. There are obtained 48 parts by weight (72 mole percent) of 3,4-epoxy-tetramethylene sulfone, M.P. 154–157° C., epoxide oxygen content: 11.3%.

Example 10

59 parts by weight of butadiene sulfone are mixed with 132 parts by volume of an aqueous solution containing 57 parts by weight of peracetic acid. After stirring for 22 hours at 60° C., the solution contains 13 parts by weight of unreacted peracetic acid. By working up according to Example 9, there are obtained 45 parts by weight (67 mole percent) of 3,4-epoxy-tetramethylene sulfone, M.P. 150–155° C., epoxide oxygen content: 11.3%.

Example 11

59 parts by weight of butadiene sulfone are treated, as in Example 10, with 88 parts by volume of an aqueous solution containing 38 parts by weight of peracetic acid. After a reaction time of 21 hours, there result 38 parts by weight (57 mole pehcent) of 3,4-epoxy-tertamethylene sulfone, M.P. 142–148° C. The compound has, after recrystallization from ethyl acetate, a melting point of 158–160° C. and an epoxide content of 11.9%.

Example 12

59 parts by weight of butadiene sulfone are heated under stirring to 60° C. with 10 parts by weight of acetic acid and 45 parts by weight of 60% hydrogen peroxide for 28 hours. Working up according to Example 9 yields 30 parts by weight (45 mole percent) of 3,4-epoxy-tetramethylene sulfone, M.P. 150–154° C., epoxide oxygen content: 11.7%.

Example 13

59 parts by weight of butadiene sulfone, 375 parts by volume of acetic acid, and 200 parts by weight of 30% hydrogen peroxide are stirred for 250 hours at 20° C. This long reaction time is necessary to complete the reaction of the hydrogen peroxide, as of the theoretically required 17 parts by weight of hydrogen peroxide, there are consumed with respect to time:

After— Percent
  8 hours _____ 12
  47 hours _____ 23
  166 hours _____ 76
  250 hours _____ 100

With the addition of ethyl benzene, there are azeotropically distilled off under vacuum at room temperature: water, acetic acid, and hydrogen peroxide. From the residue containing still 50 to 60 parts by volume of ethyl benzene, there crystallize 22 parts by weight of a mixture of 19 parts 3,4-epoxy-tetramethylene sulfone and 3 parts 3,4-dihydroxy-tetramethylene sulfone having a melting point of 139–147° C. This corresponds to a yield in epoxide of only 28 mole percent. 43 parts by weight of an oil which does not contain any epoxide oxygen remain as a residue of the mother liquor. This example was conducted based on the proportions as to concentration and quantities described in "Journal of the Chemical Society," London (1951), p. 2556.

Example 14

59 parts by weight of butadiene sulfone are heated for 152 hours with stirring to 30° C. with 181 parts by volume of an aqueous solution containing 76 parts by weight of peracetic acid. The crystals which precipitate after cooling to 4° C. are filtered and dried. There are obtained 34 parts by weight (51 mole percent) of 3,4-epoxy-tetramethylene sulfone, M.P. 153–155° C., with an epoxide oxygen content of 11.4%.

Example 15

59 parts by weight of butadiene sulfone, dissolved in 30 parts by volume of ethyl acetate, are heated to a temperature of 95° C., the boiling point of the solution. At this temperature, there are added dropwise within 4 hours 292 parts by volume of a peracetic acid solution containing 76 parts by weight of peracetic acid in ethyl acetate. After an additional reaction of one hour, 65 parts by weight of peracetic acid are consumed. When cooling to 0° C., no precipitate is obtained. The reaction solution is neutralized by means of sodium hydroxide solution, the volatile substances are evaporated at a slurry temperature of 50–80° C. under the vacuum obtained by a water aspirator. The solid residue is extracted several times with boiling dioxane. Upon concentration the dioxane solution by evaporation, there are obtained 15 parts by weight of a viscous oily product which does not contain any epoxide oxygen.

Example 16

59 parts by weight of butadiene sulfone, 375 parts by volume of acetic acid, and 200 parts by weight of 30% hydrogen peroxide are stirred for 200 hours at 20° C. Subsequently, the mixture is slowly heated to 100° C. and kept at this temperature for 6 hours. Upon the addition of ethyl benzene, acetic acid and water are azeotropically distilled off under vacuum. There remain as residue 53 parts by weight (70 mole percent) of 3,4-dihydroxy-tetramethylene sulfone, M.P. 151° C. The compound recrystallized from dioxane has a melting point of 159–160° C. and a hydroxyl number of 720. The melting point of a mixture of the product with authentic 3,4-dihydroxy-tetramethylene sulfone does not exhibit any depression.

In the following table, the reaction times and yields of 3,4-epoxy-tetramethylene sulfone achieved at various temperatures are compiled.

| Temperature, °C. | Example | Reaction Time, Hours | Yield in Epoxide, Mole Percent |
|---|---|---|---|
| 20 | 13 | 250 | 28 |
| 30 | 14 | 152 | 51 |
| 40 | 7 | 88 | 66 |
| 50 | 6 | 25 | 63 |
| 60 | 1, 2 | 19 | 70 |
| 70 | 9 | 15 | 72 |
| 80 | 8 | 7 | 45 |
| 95 | 15 | 5 | 0 |

The above table clearly proves that there is a sudden increase in yield when using the process taught by the present application (temperature range: 30–70° C.), and thus the unobvious and unexpected results provided by this invention are likewise clearly demonstrated.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for producing 3,4-epoxy-tetramethylene sulfone, said process comprising the steps of reacting butadiene sulfone with peracetic acid at 30–80° C. in the presence of a solvent, and recovering the resultant product.

2. The process of claim 1 wherein the reaction is conducted at 50–70° C.

3. The process of claim 1 wherein the peracetic acid is formed in situ by the reaction of hydrogen peroxide and acetic acid.

4. The process of claim 2 wherein the peracetic acid is formed in situ by the reaction of hydrogen peroxide and acetic acid.

5. The process of claim 1 wherein the peracetic acid is employed as an aqueous solution, said peracetic acid having a concentration of 20–70% by weight of the total aqueous solution.

6. The process of claim 1 wherein the butadiene sulfone is first at least partially dissolved in the solvent and heated to the reaction temperature before the addition of peracetic acid.

7. The process of claim 1 wherein the reaction time is 5-100 hours.

8. The process of claim 2 wherein the reaction time is 5-25 hours.

9. The process of claim 1 wherein the solvent is water or an organic solvent.

10. The process of claim 1 wherein the solvent is water, an alcohol, an ether, a ketone, an ester, a carboxylic acid, an aliphatic hydrocarbon, an aromatic hydrocarbon, or a chlorinated hydrocarbon.

11. The process of claim 1 wherein the weight ratio of solvent to the butadiene sulfone is 0.5:1 to 5:1, respectively.

12. A process for producing 3,4-epoxy-tetramethylene sulfone, which process comprises the steps of
(a) at least partially dissolving butadiene sulfone at 50–70° C. in a solvent selected from the group consisting of water, an alcohol, an ether, a ketone, an ester, a carboxylic acid, an aliphatic hydrocarbon, an aromatic hydrocarbon, and a chlorinated hydrocarbon, the weight ratio of solvent to butadiene sulfone being 0.5:1 to 5:1, respectively;
(b) adding a 20–70% by weight solution of peracetic acid to the resultant solution of butadiene sulfone, and reacting same at 50–70° C. for 5–25 hours; and
(c) recovering the resultant 3,4-epoxy-tetramethylene sulfone.

13. The process of claim 12 wherein step (c) comprises cooling the reaction mixture to precipitate easily filterable white crystals of 3,4-epoxy-tetramethylene sulfone, and filtering the resultant precipitate.

14. The process of claim 13 wherein the solvent is water and the cooling is conducted at 0–5° C.

References Cited

Zuydewijn: Rec. Trav. Chim. 57:445–455 (1938).
Fieser: Advanced Organic Chemistry (Reinhold Pub. Corp., N.Y., 1961), pp. 160–161.
Hawkins: Organic Peroxides (Spon. Ltd., London, 1961), pp. 166–170.
Sorenson et al.: Chemical Abstracts 55:12382–3 (1961).

JOHN D. RANDOLPH, *Primary Examiner.*

WALTER A. MODANCE, *Examiner.*

C. M. SHURKO, *Assistant Examiner.*